US005830580A

United States Patent [19]
Flammer et al.

[11] Patent Number: 5,830,580

[45] Date of Patent: Nov. 3, 1998

[54] PAINTED SHEET METAL PART WITH AN ANTI-CORROSION BONDING LAYER BASED ON POLYACIDS AND A METHOD FOR APPLYING SUCH A BONDING LAYER

[75] Inventors: Ute Flammer, Korb; Fritz Mezger, Ulm; Anja Keller, Blaustein; Werner Funke, Leonberg, all of Germany

[73] Assignee: Mercedes Benz AG, Stuttgart, Germany

[21] Appl. No.: 675,776

[22] Filed: Jul. 3, 1996

[30] Foreign Application Priority Data

Jul. 3, 1995 [DE] Germany ........................ 195 24 198.3

[51] Int. Cl.[6] ............................ B32B 15/08; B32B 27/00

[52] U.S. Cl. ......................... 428/461; 204/471; 204/492; 427/435; 428/339

[58] Field of Search ............................. 427/388.1, 388.2, 427/388.3, 409, 410, 435; 428/461, 339; 204/421, 492

[56] References Cited

U.S. PATENT DOCUMENTS

| | | | |
|---|---|---|---|
| 4,362,770 | 12/1982 | Mathai et al. | 427/409 |
| 5,552,227 | 9/1996 | Goldner | 427/409 X |
| 5,589,228 | 12/1996 | Wagner et al. | 427/409 X |
| 5,601,880 | 2/1997 | Schwartz et al. | 427/409 X |

FOREIGN PATENT DOCUMENTS

| | | |
|---|---|---|
| 033140 | 8/1981 | European Pat. Off. . |
| 093985 | 11/1983 | European Pat. Off. . |

OTHER PUBLICATIONS

Abstract of Published Japanese Patent Application No. JP 95–290628.

R.A. Dickie "Paint Adhesionl Corrosion Protection, and Interfacial Chemistry" *Progress in Organic Coatings*, 25 (1994) pp. 3–22.

X.H. Jin et al "The Effect of Environmental Conditions of the Adhesion of Paints to Metal" pp. 78–81, 1988.

*Primary Examiner*—Michael Lusignan
*Attorney, Agent, or Firm*—Evenson, McKeown, Edwards & Lenahan P.L.L.C.

[57] ABSTRACT

The present invention relates to a painted sheet metal part, such as a car body, with a polyacid layer between the coat of paint and the surface of the sheet metal part and to a method for applying such a coating on the part before painting. Initially, the part is cleaned and de-greased, and subsequently the polyacid layer is deposited and stabilized. In order to be able to apply this layer without losing wet adhesion qualities of the coat of paint and the anti-corrosive effect of coating layer, while presenting fewer ecological disadvantages or harmful consequences, polyacids, which comprise homopolymers or copolymers of carboxylic acids containing double bonds or of functional esters of carboxylic esters, or copolymers of carboxylic acids with vinyl compounds, are used pursuant to the present invention as the protective bonding layer. The polyacids used are further combined with polymers having a glass transition temperature above 100° C., such as phenolic resins, urea resins or epoxy resins, and/or with low molecular carboxylic acids with 2 to 30 carbon atoms in the carbon chain, in order to increase the corrosion protection effect. The deposited anti-corrosion layer is stabilized by thermal curing at about 100° to 150° C. The polymers of the corrosion inhibitor layer can be crosslinked intermolecularly, intramolecularly or with the adjacent paint layer with functional groups which are not absorbed by the substrate.

21 Claims, No Drawings

PAINTED SHEET METAL PART WITH AN ANTI-CORROSION BONDING LAYER BASED ON POLYACIDS AND A METHOD FOR APPLYING SUCH A BONDING LAYER

BRIEF DESCRIPTION OF THE INVENTION

The present invention relates to a painted sheet metal part, such as a car body, with an anti-corrosion protective bonding layer between the paint and the sheet metal. The present invention furthermore relates to a process for applying a protective bonding layer on a sheet metal part, such as a car body, before the part is painted, wherein the sheet metal part is first cleaned and de-greased, then a protective bonding layer is deposited on the surface of the sheet metal part, and this coating is subsequently stabilized on the surface of the sheet metal surface.

In this regard, the protective bonding layer according to the present invention is an anti-corrosion layer. This means that the protective bonding layer has corrosion-retarding and corrosion-preventing or corrosion-inhibiting properties.

Generally, before being painted, car bodies are usually coated with a phosphate layer approximately 2 $\mu$m thick. Subsequently, a first organic layer is applied by electrophoresis in a dip coating bath. This type of layer build-up results in a well-adhering paint coat and good corrosion protection because of the additives in the cathodic dip coated paint. There is, however, a disadvantage in that the nickel salts in the phosphate effluent and the lead salts in the electrophoretic dip coating effluent are environmentally unfriendly. The removal of these salts from the effluent and disposal thereof in the form of poisonous, hazardous waste sludges of heavy metal oxides are expensive.

It is an object of the present invention to provide an improved painted sheet metal part, such as a car body, wherein a protective bonding layer is applied directly on the sheet metal, between the sheet metal and the paint, to protect against corrosion underneath the paint. Another object of the present invention is to provide a process for applying such a protective bonding layer which is environmentally friendly without decreasing the adhesion strength of the paint and the anticorrosive action of the protective bonding layer.

These and other objectives are accomplished pursuant to the present invention by providing a protective bonding layer is comprising polyacids with at least 100 —COOH groups per polymer molecule, the polyacids comprising homopolymers or copolymers of carboxylic acids, wherein the carboxylic acids contain double bonds and/or copolymers of carboxylic acids with vinyl compounds and/or homopolymers or copolymers of carboxylic acids containing functional groups of esters of carboxylic acids, wherein the polyacids are further combined with polymers with a glass transition temperature above 100° C. and/or low molecular weight carboxylic acids with 2 to 30 carbon atoms in the carbon chain.

These and other objectives are furthermore accomplished pursuant to the present invention by providing a process wherein polyacids with at least 100 —COOH groups per polymer molecule are used as an adhesion-promoting polymer, the polyacids consisting of homopolymers or copolymers of carboxylic acids containing double bonds and/or of copolymers of carboxylic acids with vinyl compounds and/or of homopolymers or copolymers of carboxylic acids with functional groups of esters of carboxylic acids, the polyacids are further combined with polymers having a glass transition temperature above 100° C. and/or with low molecular weight carboxylic acids with 2 to 30 carbon atoms in the carbon chain the adhesion-promoting layer is formed from an aqueous solution of polyacids at a concentration of 0.1 to 5.0% by weight, preferably of 0.2 to 2% by weight, and the protective bonding layer is stabilized by immobilization through heating.

Accordingly, polyacids are used which consist of homopolymers or copolymers (vinyl compounds) of carboxylic acids, wherein the carboxylic acids contain double bonds, or of homopolymers or copolymers of carboxylic acids and esters with functional groups, such as hydroxy groups, which can also be blocked. According to the present invention, the monomers are unsaturated, whereas the resulting polymers are saturated. Furthermore, the functional group of carboxylic acid ester may be 2-hydroxyethyl acrylate. These polyacids are further combined with polymers having a high glass transition temperature of, for example, more than 100° C., such as phenolic resins, urea resins or epoxy resins as layer-consolidating polymers or with low molecular weight, water-soluble carboxylic acids with two to thirty carbon atoms in the chain, or with both together, which as a result increases the anti-corrosive effect. The ratio of polyacids to low molecular weight carbonic acids is between 10:1 and 1:10, preferably between 5:1 and 1:2, by weight. In the context of the present invention, combining refers to admixing or reacting. According to the present invention, the polyacid layer is immobilized by heat, meaning that further microscopic or macroscopic movement of the molecules are eliminated without subsequent reaction with the sheet metal, and at the same time, the layer becomes insoluble in water as a result of an oxidation of Fe(II) to Fe(III).

It has been found that the anti-corrosive action of the polyacids as disclosed in the present invention, is caused essentially by the fact that the wet adhesion of the polyacid layer is particularly good. The action of the functional groups results in a very intimate bond between the polyacid bonding layer and the metal surface, which in turn results in good adhesion when exposed to water and also effective corrosion protection. The polyacid layer applied pursuant to the present invention thus replaces the previously customary phosphate and cathodic dip coating, whereby the necessary corrosion protection is ensured by the bonding layer.

According to Gao, Z. et al. "Verbesserung der Naßhaftfestigkeit organischer Beschichtungen auf Stahloberflächen" (Improvement in the Wet Adhesion of Organic Coatings on Steel Surfaces) , Farbe and Lack 98 (1992) , pages 917 et seq., polyacids are disclosed which, alone or as copolymers with esters or aromatic compounds, improve the wet adhesion of paints to metals such as steel or aluminum. However, corrosion protection, which is important for car paint finishes and was previously achieved by the phosphate layer, cannot be achieved with polyacids alone. As disclosed in Dickie, R. A., "Paint Adhesion, Corrosion Protection and Interfacial Chemistry," Progress in Organic Coatings 25 (1994), pages 3–22, and in Jin, X. H. et al. "The Effect of Environmental Conditions on the Adhesion of Paint to Metals," JOCCA 1988(3), pages 78 et seq., wet adhesion and corrosion protection do not always correlate. Furthermore, even the knowledge that polyacrylic acid can be deposited anodically would not lead one skilled in the art to the present inventive improvement in thin protective bonding layer application, which is anti-corrosive and environmentally friendly.

The advantages of the present invention are as follows:

Considerably better corrosion protection can be achieved with the protective bonding layer of the present invention as compared to previous systems with polyacids.

Previously, effective corrosion protection could only be achieved with the joint use of phosphate coating and cathodic dip coating.

The high corrosion protection characteristic of the inventive protective bonding layer alone, enables the process to be significantly simplified. Namely, the cathodic dip coated primer can be omitted, and the filler paint can be immediately applied by dip application, optionally by electrophoresis.

Through a deposition, such as by anodic deposition for example, of the anti-corrosive layer, the present invention ensures a process which is environmentally friendly, without the problems associated with purifying effluent and/or disposing of sludge. Moreover, polyacids can be used in the salt form, so that polyacids which are only slightly soluble in water can be used.

The electrical deposition furthermore has the advantage that the adhesion-promoting acidic groups of the polyacids are more oriented towards the substrate and can thus react better with the metal surface.

The very good anti-corrosive properties of the polyacid are independent of the material and can also be used for mixed constructions, such as for car bodies produced from steel and light metals or alloys. According to the present state of the art, it is not possible to phosphatize steel and aluminum simultaneously because aluminum contaminates the phosphate bath.

Other objects, advantages and novel features of the present invention will become apparent from the following detailed description of the invention.

DETAILED DESCRIPTION OF THE INVENTION

According to a preferred embodiment, the protective bonding layer only needs to be about 10 to 500 nm thick, preferably 50 to 200 nm thick. Such a thin layer provides effective wet adhesion and protective action and can be applied and thermally cured in a relatively short time. In a further preferred embodiment, the protecting bonding layer is applied as the first paint layer of a filler layer, which is preferably applied by dipping (cathodically or without application of electric current).

A preferred process of applying the protective bonding layer according to the present invention comprises applying the protective bonding layer by dipping the sheet metal part, such as a car body, into a bath, wherein the application is furthermore supported by electrophoresis with a positively charged workpiece, that is, anodically. The anodically-supported layer application results in a more rapid, closed and oriented layer construction. The immobilization of the protective bonding layer is preferably accomplished by heating to a temperature of 50° to 200° C., preferably to a temperature of 100° to 150° C. Furthermore, the immobilization of the protective bonding layer can preferably be supplemented or supported by crosslinking with functional groups in the polymers, which are not adsorbed by the sheet metal surface, which results in a very closed film bond within the protective bonding layer, which in turn results in very good bonding to the next layer. Examples of such functional groups are —OH, —COOH, $NH_2$ and epoxies. The crosslinking can take place within the protective bonding layer (intermolecularly or intramolecularly) and/or with the adjacent paint layer. The protective bonding layer can be crosslinked before or simultaneously with the thermal curing of the next paint layer.

The present invention can be universally used for the corrosion protection of metals and can also be used simultaneously on different metals, such as steel, aluminum or magnesium. The polyacid can be applied by anodic deposition as well as by currentless dipping.

EXAMPLE

The following are test results of an example according to the present invention. Test panels (American test panels referred to as Q panels, sold in Germany by Pausch) from conventionally rolled sheet steel for car bodies (the material is referred to as RR-St 13) were pretreated with an aqueous polyacrylic acid solution and were subsequently coated with a two-component polyurethane clear lacquer. The wet adhesion of the top coat and the corrosion resistance were tested.

A polyacrylic acid with a molecular weight of 450,000 was used for the pretreatment. The polyacrylic acid was dissolved in water to form a 0.5% by weight solution. To make the deposition of the polyacrylic acid more uniform, 5% by volume of ethanol based on the total amount of solution, was added. To bind hydrogen during the anodic deposition, that is, to form a bubble-free deposition, 0.315% by weight of hydroxylammonium sulfate was added. The polyacrylic acid was applied anodically from the aqueous solution onto the test panel at a current density of 0.66 $mA/cm^2$ for a period of 3 minutes. Subsequently, the test panel was dried for 10 minutes at 200° C. The lacquer was applied at the customary thickness and thermally cured.

The wet strength was determined by the tape peel test. For this purpose, the sample was placed in distilled water at room temperature for a specified time. Subsequently, a slit was cut in the sample and the sample was superficially dried with a towel. Then a pressure-sensitive adhesive test tape of a specified width and with defined and reproducible contact adhesive properties was glued symmetrically over the slit. The test was ended when more than 10% of the coating, based on the surface area of the adhesive tape, was detached from the test panel when the pressure-sensitive tape was pulled off, while noting the soaking time in the water. If less than 10% of the coating detached, the panel was placed back in the water for a further period, after which the peel test was repeated on a new slit. Immersion in water and the peel test on a new slit were repeated at specific, increasing time intervals, until the coating detached for the first time from the test panel in the area of the slit. The cumulative time intervals for the immersions of the sample in distilled water up to the onset of lacquer detachment, in hours, were used as a measure of the wet adhesion. The wet adhesion of the coating on the test panels was 1300 hours (about 54 days) . In the case of untreated test panels, which were coated under otherwise similar conditions, the coating detached already after 2 hours of immersion in water.

To determine the corrosion resistance, the lacquer layer was slit with an Erichsen stylus in a defined cross-sectional shape, 1 mm in width, through to the base material of the test panel. Subsequently, the slit test panel was exposed to the VDA (VDA=Verband der deutschen Automobilhersteller (Association of German Automobile Manufacturers)) varying weather test. A VDA test cycle takes one week and consists of a 24 hour salt spray test, a 96 hour changing climate test and a 48 hour storage test at room temperature at about 50% relative humidity. The 96 hour test in a changing climate consists of four cycles of 8 hours of drying and 16 hours of storage at 40° C. and 90% relative humidity. The amount of penetration of water underneath the coating was measured at several places and the average was calculated. The amount of penetration of water under the coating is a measure of the corrosion resistance relative to the number of test cycles. The amount of coating, detached or loosened from the substrate, is of decisive importance here. With the coating according to the present invention, it was possible to detect a 15 to 20 mm migration of water under the coating after seven weather cycles. As a comparison, the migration under the coating of test panels, which had not been treated but were otherwise similarly coated under comparable conditions, was 50 to 60 mm after only one weather cycle.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A painted sheet metal part with an anti-corrosive protective bonding layer between the paint and the sheet metal, wherein the protective bonding layer comprises polyacids with at least 100 —COOH groups per polymer molecule, the polyacids consisting of at least one of homopolymers or copolymers of carboxylic acids containing double bonds copolymers of carboxylic acids with vinyl compounds and homopolymers or copolymers of carboxylic acids containing functional groups of esters of carboxylic acids, and the polyacids are combined with at least one of polymers with a glass transition temperature above 100° C. and low molecular weight carboxylic acids with 2 to 30 carbon atoms in the carbon chain.

2. The sheet metal part of claim 1, wherein the protective bonding layer is 10 to 500 nm thick.

3. The sheet metal part of claim 1, wherein the first layer of paint on the protective bonding layer is a filler layer.

4. The sheet metal part of claim 1, wherein the polymers with a glass transition temperature above 100° C. are selected from the group consisting of phenolic resins, urea resins and epoxy resins.

5. The sheet metal part of claim 1, wherein the painted sheet metal part is a car body.

6. The sheet metal part of claim 1, wherein the protective bonding layer is 50 to 200 nm thick.

7. A method for applying an anti-corrosive protective bonding layer on a sheet metal part prior to painting, comprising the steps of cleaning and de-greasing the sheet metal part, depositing the protective bonding layer on the surface of the sheet metal part in the form of an aqueous solution of polyacids at a concentration of 0.1 to 5.0% by weight, and stabilizing the protective bonding layer on the surface of the sheet metal part by heating the protective bonding layer, wherein the protective bonding layer comprises adhesion-promoting polyacids with at least 100 —COOH groups per polymer molecule, the polyacids consisting of at least one of homopolymers or copolymers of carboxylic acids containing double bonds, copolymers of carboxylic acids with vinyl compounds, and homopolymers or copolymers of carboxylic acids with functional esters of carboxylic acids, and the polyacids are further combined with at least one of polymers having a glass transition temperature above 100° C. and low molecular weight carboxylic acids with 2 to 30 carbon atoms in the carbon chain.

8. The method of claim 7, comprising the step of crosslinking the polyacids intermolecularly, intramolecularly or to the adjacent paint layer with functional groups which are not absorbed by the substrate.

9. The method of claim 7, comprising the step of combining the polyacids with polymers with a glass transition temperature above 100° C. selected from the group consisting of phenolic resins, urea resins and epoxy resins.

10. The method of claim 7, wherein the stabilization step comprises heating the protective bonding layer to a temperature between 50° and 200° C.

11. The method of claim 7, wherein the deposition step comprises applying the protective bonding layer by dipping the sheet metal part in a bath.

12. The method of claim 11, wherein the deposition step comprises applying the protective bonding layer by electrophoresis.

13. The method of claim 7, wherein the deposition step comprises depositing the protective bonding layer on a car body.

14. The method of claim 7, wherein the deposition step comprises depositing the protective bonding layer on the surface of the sheet metal part in the form of an aqueous solution of polyacids at a concentration of 0.2 to 2% by weight.

15. The method of claim 7, wherein the stabilization step comprises heating the protective bonding layer to a temperature between 100° and 150° C.

16. The method of claim 11, wherein the deposition step comprises applying the protective bonding layer by anodic deposition.

17. A painted sheet metal part with an anticorrosive protective bonding layer between the paint and the sheet metal, wherein the protective bonding layer comprises polyacids with at least 100 —COOH groups per polymer molecule, the polyacids consisting of at least one of homopolymers of carboxylic acids containing double bonds, copolymers of different carboxylic acids each containing double bonds, copolymers of carboxylic acids containing double bonds with vinyl compounds, homopolymers or copolymers of carboxylic acids containing double bonds with functional esters of carboxylic acids, and the polyacids are combined with at least one of polymers with a glass transition temperature above 100° C. and low molecular weight carboxylic acids with 2 to 30 carbon atoms in the carbon chain.

18. The sheet metal part of claim 17, wherein the protective bonding layer is 10 to 500 nm thick.

19. The sheet metal part of claim 17, wherein the first layer of paint on the protective bonding layer is a filler layer.

20. The sheet metal part of claim 17, wherein the polymers with a glass transition temperature above 100° C. are selected from the group consisting of phenolic resins, urea resins and epoxy resins.

21. The sheet metal part of claim 17, wherein the painted sheet metal part is a car body.

* * * * *